United States Patent
Günther et al.

(10) Patent No.: US 11,142,248 B2
(45) Date of Patent: Oct. 12, 2021

(54) VEHICLE LONGITUDINAL BEAM ARRANGEMENT

(71) Applicant: Kirchhoff Automotive Deutschland GmbH, Attendorn (DE)

(72) Inventors: Alexander Günther, Olpe (DE); Maria Schmitt, Attendorn (DE); Marco Töller, Cologne (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 81 days.

(21) Appl. No.: 16/636,623

(22) PCT Filed: Aug. 13, 2018

(86) PCT No.: PCT/EP2018/071940
§ 371 (c)(1),
(2) Date: Feb. 4, 2020

(87) PCT Pub. No.: WO2019/034618
PCT Pub. Date: Feb. 21, 2019

(65) Prior Publication Data
US 2020/0398895 A1 Dec. 24, 2020

(30) Foreign Application Priority Data

Aug. 14, 2017 (DE) .......................... 102017118515.1

(51) Int. Cl.
*B62D 21/15* (2006.01)
*B62D 21/02* (2006.01)
(Continued)

(52) U.S. Cl.
CPC ............. *B62D 21/15* (2013.01); *B62D 21/02* (2013.01); *B62D 27/02* (2013.01); *B60R 19/12* (2013.01);
(Continued)

(58) Field of Classification Search
CPC ........ B62D 21/15; B62D 21/02; B62D 27/02; B62D 25/082; B62D 21/152; B60R 19/12; B60R 19/34
(Continued)

(56) References Cited

U.S. PATENT DOCUMENTS 6,866,333 B2 * 3/2005 Saitou .................. B62D 25/084
293/155
8,720,983 B1 * 5/2014 Edwards ................ B62D 25/16
296/203.02

(Continued)

FOREIGN PATENT DOCUMENTS

CN 102785701 A 11/2012
DE 10335257 A1 3/2005
(Continued)

OTHER PUBLICATIONS

International Search Report dated Feb. 21, 2019 in parent International application PCT/EP2018/071940.
(Continued)

*Primary Examiner* — D Glenn Dayoan
*Assistant Examiner* — Dana D Ivey
(74) *Attorney, Agent, or Firm* — Polson IP Law, PC; Margaret Polson; Christopher Sylvain

(57) ABSTRACT

A vehicle longitudinal member arrangement having two longitudinal members that are spaced apart from one another in the z direction and are designed to absorb energy in the case of an impact, and having a connection component which connects the longitudinal members to one another. The connection component has its main extension in one plane and has an upper attachment section and a lower attachment section. The connection component is arranged with its main extension plane parallel to the longitudinal extension of the longitudinal members connected by said
(Continued)

component. Each of the two attachment sections has two attachment points arranged spaced apart from one another in the longitudinal extension of the longitudinal members, at which points the connection component is connected to the respective longitudinal member, while the section of the connection component located between the attachment points is not connected to the respective longitudinal member. The connection component is designed to be weaker in its section located between the attachment points in the direction of the longitudinal extension of the longitudinal member than the sections bearing the attachment points, for the absorption of impact energy.

20 Claims, 3 Drawing Sheets

(51) Int. Cl.
  *B62D 27/02* (2006.01)
  *B60R 19/12* (2006.01)
  *B60R 19/34* (2006.01)
  *B62D 25/08* (2006.01)

(52) U.S. Cl.
  CPC ............ *B60R 19/34* (2013.01); *B62D 21/152* (2013.01); *B62D 25/082* (2013.01)

(58) Field of Classification Search
  USPC .................................................. 296/187.03
  See application file for complete search history.

(56) References Cited

U.S. PATENT DOCUMENTS

| | | |
|---|---|---|
| 8,950,794 B2 | 2/2015 | Lenkenhoff |
| 9,446,799 B2 | 9/2016 | Franzpötter |
| 9,598,100 B2 | 3/2017 | Lenkenhoff |
| 9,764,764 B2 | 9/2017 | Irle |
| 10,005,495 B2 | 6/2018 | Töller |
| 10,577,025 B2 | 3/2020 | Michler |
| 2019/0185060 A1 | 6/2019 | Gündogan |
| 2019/0344385 A1 | 11/2019 | Töller |

FOREIGN PATENT DOCUMENTS

| | | |
|---|---|---|
| DE | 102004028161 A1 | 12/2005 |
| DE | 60126209 T2 | 11/2007 |
| DE | 102006041092 B4 | 3/2008 |
| DE | 102013207236 A1 | 10/2013 |
| DE | 102015008443 A1 | 12/2015 |
| DE | 102014219433 A1 | 3/2016 |
| EP | 0980815 A1 | 2/2000 |
| EP | 1388485 A1 | 2/2004 |
| WO | 2016207038 A2 | 12/2016 |

OTHER PUBLICATIONS

Written Opinion of the International Searching Authority dated Feb. 21, 2019 in parent International application PCT/EP2018/071940.
U.S. Appl. No. 16/637,135, filed Feb. 6, 2020 (Töller), applicant Kirchhoff Automotive Deutschland GmbH.
U.S. Appl. No. 16/633,769, filed Jan. 24, 2020 (Günther), applicant Kirchhoff Automotive Deutschland GmbH.

* cited by examiner

VEHICLE LONGITUDINAL BEAM ARRANGEMENT

BACKGROUND

The present disclosure relates to a vehicle longitudinal member arrangement having two longitudinal members spaced apart from one another in the z direction and designed to absorb energy in the case of impact, and having a connection component that has its main extension in one plane and has an upper attachment and a lower attachment art, by means of which the longitudinal members are connected to one another.

Longitudinal member assemblies in vehicle end regions, especially at the front end, serve the purpose in the event of an impact of introducing the impact energy into the vehicle via multiple load paths. Such vehicle longitudinal member assemblies typically comprise at least two longitudinal members assigned to one side of the vehicle and arranged one above the other in the vertical direction (z direction), spaced apart from one another. These longitudinal members may be configured differently in terms of their cross-sectional geometry and their cross-sectional area. The transverse member of a bumper connected to at least one longitudinal member of such a longitudinal member arrangement, with the interposition of a so-called crash box. The crash boxes of the longitudinal members are part of the vehicle's crash management system and, in the case of an impact above a certain impact energy, serve to absorb energy by deforming plastically in at least one section under the impact energy. The longitudinal members are also integrated into the vehicle's crash management system. In the case of higher impact energy that has already led to a complete deformation of the crash boxes, the longitudinal members must also absorb impact energy through deformation. The longitudinal members on each side of the vehicle are also integrated into the crash management system in order to transfer the energy of an impact into the body via multiple load paths. In such an embodiment, at least two longitudinal members arranged one above the other in the z direction are provided, and are connected to one another in each case by a connection component.

DE 10 2014 219 433 A1 discloses a body arrangement, for a front end structure of a motor vehicle. This body arrangement has a lower main longitudinal member arrangement, at the front end of which a bumper cross-member is arranged, an upper member arrangement that extends above a wheel suspension, and a tension strap that is fastened at a first fastening point to a front region of the main longitudinal member arrangement and at a second fastening point to the upper member arrangement. The upper member arrangement is connected to the longitudinal member by a suspension strut supporting member. A crash box that supports a bumper cross-member is attached to the end of the longitudinal member that points in the direction of travel. In this known body arrangement, shock absorption occurs in the crash box. The energy introduced into the longitudinal member is divided into two superimposed load paths by the suspension strut supporting member. The longitudinal member with its upper member arrangement is not involved in energy absorption.

From DE 10 2006 041 092 B4, a crumple zone of a body of a motor vehicle having a body component is known, which body component comprises a plurality of hollow chambers and is thus designed as a deformation element designed to contribute to lengthening the crumple length of the crumple zone of the motor vehicle body. This body component further has a supporting region, located at a distance from the associated end of the support member profile, the support member profile being additionally supported against the supporting region of the body component in the event of an accident-related application of force. This crumple zone is located immediately adjacent to the passenger compartment. Due to its configuration, within the crumple zone impact energy is divided into two load paths spaced horizontally from one another. This prior art does not involve a vehicle longitudinal member arrangement comprising two longitudinal members arranged one above the other.

DE 601 26 209 T2 discloses a body structure having a reinforced, lower longitudinal member, which lower longitudinal member is connected to an upper longitudinal member via bolts. This connection of the two longitudinal members in different planes results in a stiffening of the body structure for a motor vehicle, which reduces its capacity for absorbing deformation energy. This structure is therefore not intended to absorb energy through deformation and thus is not integrated into the active crash management system.

From DE 103 35 257 A1, a front end of a motor vehicle body is known that enables a particularly simple and weight-saving design of the front end. Here, a reinforcement arrangement is used that connects a radiator cross-member to a bumper cross-member. Thus, this prior art also does not relate to a vehicle longitudinal member arrangement having two longitudinal members arranged one above the other.

From WO 2016/207038 A2, a support device for a front end of a passenger vehicle is known, with which three longitudinal members arranged one above the other in the z direction are connected to one another by means of a connection component. This known connection component is attached to the end faces of the longitudinal members. This component involves a complex geometry. The purpose of this connection component is to hold the longitudinal members at a defined distance at their front end, which points away from the body, in order to prevent one longitudinal member from buckling in relation to the other(s) in the event of an impact.

From DE 10 2013 207 236 A1, a further vehicle longitudinal member arrangement is known, in which on each side of the vehicle, two longitudinal members arranged one above the other in the z direction are connected to one another by a connection component. The connection component is attached to the lower longitudinal member with a material weakening point, so that when a certain energy to be coupled in is exceeded, it is introduced thereafter only into the lower longitudinal member. When the material weakening point is used to absorb impact energy, the energy is no longer divided. The connection component according to this prior art is located outside of the part of the upper longitudinal member intended for energy-absorbing deformation. For an initial energy absorption in the vehicle longitudinal member arrangement known from this prior art, the end of the upper longitudinal member is embodied as telescopic, so that energy absorption does not lead to deformation. Instead, in this configuration the energy is consumed by pushing the two longitudinal member profile sections into one another. Only then does the upper longitudinal member also undergo deformation in the case of an impact. Therefore, force is introduced via multiple load paths only after the outer longitudinal member section has been pushed telescopically into the section behind it.

It would be desirable, however, to introduce force into the body of the vehicle via multiple load paths even with lower impact energy. This is the case with the connection component known from WO 2016/207038 A2. This previously known vehicle longitudinal member arrangement is equipped with a receptacle that extends a certain longitudinal distance for receiving each longitudinal member. The longitudinal members thus are not only connected to one another by the connection component at the distance at which they engage in the same, but are also reinforced by said component, so that this length in the vehicle longitudinal direction (x direction) is not available for energy absorption by deformation. To nevertheless provide the same deformation path as an embodiment without such a connection component, the vehicle overhang must be correspondingly longer.

SUMMARY

Proceeding from this background, an aspect of the present disclosure is therefore to propose a vehicle longitudinal member arrangement in which two longitudinal members arranged one above the other in the z direction are connected to one another by a connection component that does not significantly influence energy absorption by plastic deformation of the longitudinal members, so that with this vehicle longitudinal member arrangement the vehicle overhang does not need to be extended, at least not significantly, despite the provision of a connection component connecting two longitudinal members arranged one above the other.

This is achieved by a vehicle longitudinal member arrangement of the type mentioned at the outset, in which the connection component is arranged with its main extension plane parallel to the longitudinal extension of the longitudinal members connected by said component, in which the two attachment sections each have two attachment points arranged spaced apart from one another in the longitudinal extension of the longitudinal member, at which points the connection component is connected to the respective longitudinal member, while the portion of the connection component located between the attachment points is not connected to the respective longitudinal member, and in which the connection component is designed to be weaker in its section located between the attachment points in the direction of the longitudinal extension of the longitudinal member than the sections bearing the attachment points, for the absorption of impact energy.

In this vehicle longitudinal member arrangement, the connection component is arranged with its main extension plane parallel to the longitudinal extension of the longitudinal members. What is special about this vehicle longitudinal member arrangement is that the connection component is connected with its upper attachment section and with its lower attachment section to the respective longitudinal member only by means of attachment points spaced apart from one another in the longitudinal extension of the longitudinal members. Between the two attachment points, the connection component is not connected to the longitudinal member. The connection component itself is designed to absorb impact energy in its main extension plane and thus in the longitudinal extension of the longitudinal members connected by it. Thus, the two attachment points provided spaced apart from one another on the upper and on the lower attachment section, and the connection component that is likewise designed to be plastically deformable for energy absorption in the direction of energy absorption of the longitudinal members, constitute part of the crash management system of the vehicle. Between the attachment points, the longitudinal members are able to absorb energy in the event of an impact in the manner intended for them, by plastic deformation. In the subject matter of the present disclosure, the connection element does not block such plastic deformation, in contrast to corresponding prior art arrangements.

The above-described arrangement of the connection component with its main extension plane in the longitudinal extension of the longitudinal members is an approach that, in light of the problems described in reference to the prior art, was formerly unavailable to a person skilled in the art. Ultimately, in the prior art, this type of measure was regularly associated with a blockage of plastic deformation in the region of the connection component.

With such an arrangement of the connection component to connect the two longitudinal members, the members are additionally reinforced relative to one another in the transverse direction (y vehicle direction) and also in the direction of the vertical axis (z direction). Such a preferred transverse reinforcement has thus been skillfully combined with a connection component that does not, or in any case does not significantly, impair the energy absorption in the longitudinal axial direction. For this reason, such a connection element can also extend over a greater longitudinal extension of the longitudinal members. Previously, this was not possible, as the vehicle overhang would have then had to be unnecessarily large.

The section of the connection component in which said component is connected to the longitudinal member does not block any deformation of said member for the purpose of energy absorption in the event of a crash. Nevertheless, the longitudinal extension of the connection element can be used for a progressive design of the crash management system of the vehicle longitudinal member arrangement. This means that the design of the connection component can also influence the crash behavior.

The attachment points of the upper attachment section and those of the lower attachment section are preferably aligned with one another in the z direction.

To allow the longitudinal member sections that are located between the spaced-apart attachment points greater freedom in terms of their deformation during the absorption of shocks, one refinement provides that the attachment sections are formed by protruding segments that extend in the z direction. The attachment points are located in these protruding segments. In the case of deformation, in a deformation phase the longitudinal member attached to such an attachment section can enter into the space located in the longitudinal extension between the protruding segments and is therefore not blocked in this respect.

The connection component can be attached to the longitudinal members connected by, said component via the two attachment sections of said connection component in the same plane, for example in the x-z plane. In another embodiment it is provided that the connection component is attached to one longitudinal member in a first plane, for example in the x-z plane, and to the other longitudinal member in another plane, for example in the x-y plane. Also possible is a configuration in which the connection component is attached to the upper longitudinal member, for example, in the x-z plane and to the end of the other longitudinal member that points forward in the direction of travel, and thus in the y-z plane. The latter is possible in particular if the other longitudinal member, typically the lower longitudinal member, has, for example, a transverse extension that projects outward in the y direction, so that the connection component can be attached to the front side of said extension that points in the direction of travel. The above-described options for attaching a connection component to the longitudinal members in the described planes should be understood as examples. The connection component can also be attached in the same way to the first longitudinal member not only in the x-z plane described by way of example, but also in another plane.

To support a defined deformation of the connection component in the case of a crash deformation, the connection component according to a further refinement s not only designed to be weaker between the sections bearing the attachment points for the purpose of absorbing impact energy, but is also equipped with crash structures provided between the attachment points. These structures may be embodied as stamped formations, as ribs, or as cutouts. This list is not exhaustive. A combination of these and other measures is possible. For example, the connection component may have a central cutout, which does more than simply reduce the weight of the connection component. It also results in a defined material weakening, with defined crash zones being formed by the remaining webs that extend in the x direction. To achieve increased rigidity of the connection component, in one embodiment it is provided that the cutout is surrounded by a stamped formation, configured in the manner of a shoulder. The edge region of the cutout is reinforced by the stamped formation.

The connection component itself can be a sheet steel component, which is brought into its desired shape by a forming process. The aforementioned stamping may also have been provided in the course of such forming, as may an angled edge fully or partially surrounding said cutout. It is also possible for connection components made of another suitable material to be used, for example a light metal, such as an aluminum alloy or a composite material.

The above-described design of a connection component can also be used in the same way if more than two longitudinal members, for example three longitudinal members arranged one above the other in the z direction, are to be connected to one another.

The directional information used in the context of this description, specifically the x direction, the y direction, and the z direction, refer to the main directions of a vehicle and therefore also apply to the vehicle longitudinal member arrangement described. The x direction is the longitudinal extension of the vehicle, the y direction is the direction along the width of the vehicle, and the z direction is the direction in the direction of the vertical axis.

BRIEF DESCRIPTION OF THE DRAWINGS

The description of the present disclosure is provided below using example embodiments with reference to the attached figures, wherein.

DETAILED DESCRIPTION

Figure 1:
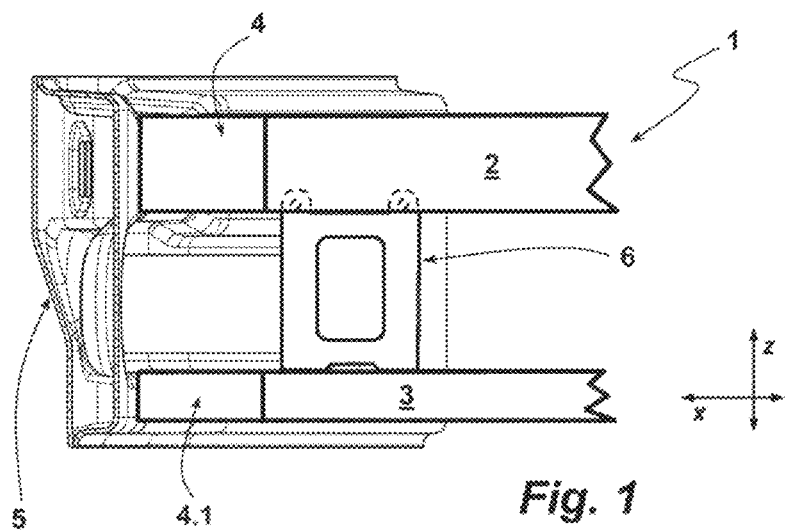
FIG. 1 shows a schematic side view of a vehicle longitudinal member arrangement to which a bumper cross-member is attached.

A vehicle longitudinal member arrangement 1 is located on the right and the left side areas of a vehicle, which is otherwise not shown in detail. FIG. 1 shows such a vehicle longitudinal member arrangement 1, which is located in the region of the right-hand side pointing in the direction of travel of a vehicle that is otherwise not shown in detail. The longitudinal member arrangement 1 comprises an upper longitudinal member 2 and a lower longitudinal member 3. The longitudinal members 2, 3 are spaced apart from one another in the z direction. In the embodiment depicted, the cross-sectional area of the upper longitudinal member 2 is significantly greater than that of the lower longitudinal member 3. Therefore, the longitudinal member 2 forms the main load path via which energy is coupled into the other body components of the vehicle in the case of an impact. The longitudinal members 2, 3 are attached to a bumper cross-member 5 with crash boxes 4, 4.1 interposed therebetween. In the case of an impact, the crash boxes 4, 4.1 of the longitudinal members 2, 3 are designed to absorb the impact energy beyond a certain impact strength by plastic deformation.

Figure 2:
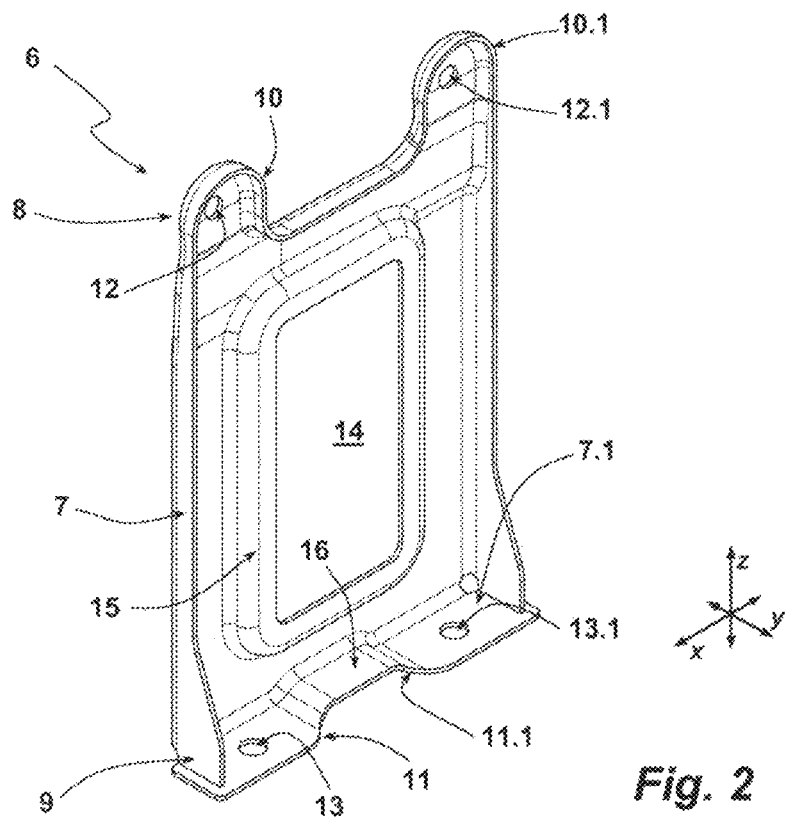
FIG. 2 shows a perspective view of a connection component used in the vehicle longitudinal member arrangement of FIG. 1.

Impact energy acting on the bumper cross-member 5 is coupled into the two longitudinal members 2, 3. When energy is to be absorbed, the distance between the two longitudinal members in the z direction should remain constant. Thus, any buckling in the z direction of one longitudinal member 2, 3 relative to the other should be avoided. To guarantee this, the two longitudinal members 2, 3 are connected to one another in the area of their sections that border the crash boxes 4, 4.1 by a connection component 6. The connection component 6 is shown in more detail in FIG. 2. The connection component 6 of the embodiment depicted is a formed sheet steel component and has a planar extension. This is the main extension plane of the connection component 6. In the longitudinal member arrangement 1, said plane is located in the x-z plane. The connection component 6 has an edge 7, 7.1, which is bent at an angle and extends around the periphery of the planar extension. The edge 7, which is bent at an angle relative to the main extension plane of the connection component 6, serves to reinforce the connection component 6.

The connection component 6 has an upper attachment section 8 and a lower attachment section 9. The connection component 6 is connected with the upper attachment section 8 to the upper longitudinal member 2 and with its lower attachment section 9 to the lower longitudinal member 3. In the embodiment depicted, each attachment section is formed by two protruding segments 10, 10.1, 11, 11.1, which are spaced apart from one another in the x direction. Each protruding segment 10, 10.1, 11, 11.1 has an attachment point 12, 12.1, 13, 13.1, at or via which the connection component 6 is connected to the respective longitudinal member 2 or 3. In the embodiment shown, the attachment points 12, 12.1, 13, 13.1 are provided by circular openings, so that the connection component 6 can be connected to the respective longitudinal member 2 or 3 by mechanical fasteners, for example screws or rivets. The connection component 6 is attached to the longitudinal members 2, 3 exclusively at its attachment points 12, 12.1, 13, 13.1. The protruding segments 10, 10.1, 11, 11.1 serve the purpose, on one hand, of creating space for plastic deformation of the respectively adjacent longitudinal member 2 or 3. On the other hand, the protruding segments create a zone between the attachment points 12, 12.1, 13, 13.1, in which the connection component 6 can be plastically deformed in the case of energy absorption. In the case of energy absorption by plastic deformation of the longitudinal members 2, 3, the connection component 6 is therefore likewise deformed between its attachment points 12, 13 and 12.1, 13.1, respectively, which lie one above the other in the z direction, and thus contributes to the energy that can be absorbed by plastic deformation.

In the embodiment depicted, a folding system for energy absorption is also favored in the section of the connection component 6 located between the attachment points 12, 13, 12.1, 13.1 in that the connection component 6 has a crash structure element in the form of a central cutout 14. The cutout 14 in connection component 6 is configured as approximately rectangular. To reinforce the central region of the connection component in its main extension plane, the opening 14 is surrounded by a peripheral stamped formation 15. The stamped formation 15 has the shape of a shoulder in cross-section. This stamped formation 15 gives the connection component 6 additional rigidity. This has a favorable effect on the torsional rigidity of the connection component 6, as a result of which the longitudinal members 2, 3 lying one above the other maintain their proper alignment with one another even under an uneven transverse load.

In the embodiment shown, the edge 7 is embodied as an edge that is bent relative to the original plate in order to form the protruding segments 11, 11.1 with the attachment points 13, 13.1. The remaining edge 7 of the connection component 6 is produced during the forming process by which the connection component 6 is produced from a steel plate, as is the stamped formation 15. The configuration of the lower edge 7.1, which is provided for attachment to the member 3, as having a greater edge width serves to provide a larger abutting surface area. Of significance is that the two protruding segments 11, 11.1 are separated from one another by a rib 16.

Figure 3:
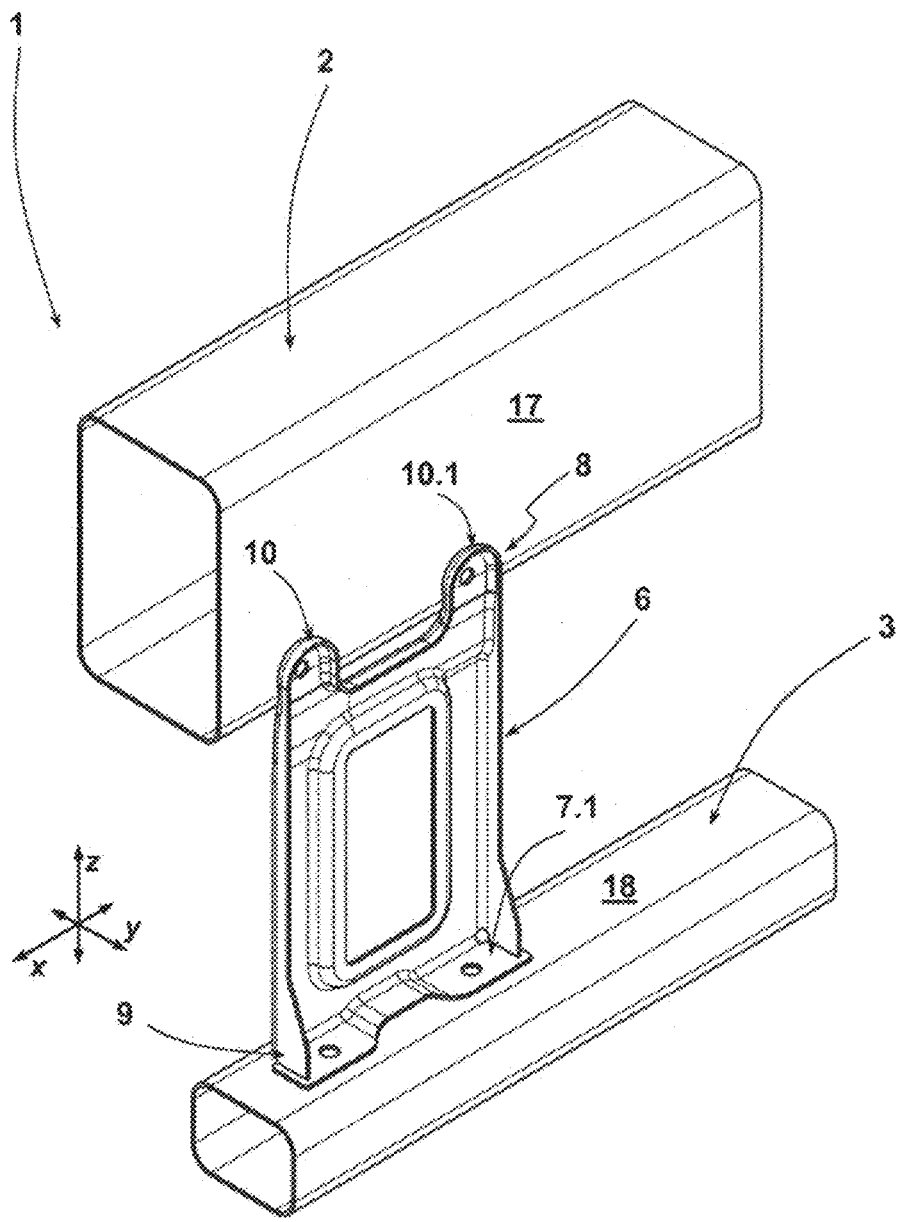
FIG. 3 shows a perspective detailed view of the vehicle longitudinal member arrangement of FIG. 1 without the bumper cross-member.

The longitudinal member arrangement 1 with its connection component 6 connecting the longitudinal members 2, 3 is shown in the perspective illustration of FIG. 3. In the embodiment shown, the connection component 6 is attached via its upper attachment section 8 to a lateral wall 17 of the upper longitudinal member 3 located in the x-z plane. As is clear from the illustration in FIG. 3, only the protruding segments 10, 10.1 that form the upper attachment section 8 rest with their flat side against the lateral wall 17. The screw connectors used to connect the connection component 6 to the upper longitudinal member 2 are not shown in FIG. 3.

The connection component 6 is attached via its lower edge 7.1 to the upper side 18 of the lower longitudinal member 3, likewise using screw connectors, which are not shown in the figure. The upper side 18 of the longitudinal member 3 is located in the x-y plane.

Figure 4:
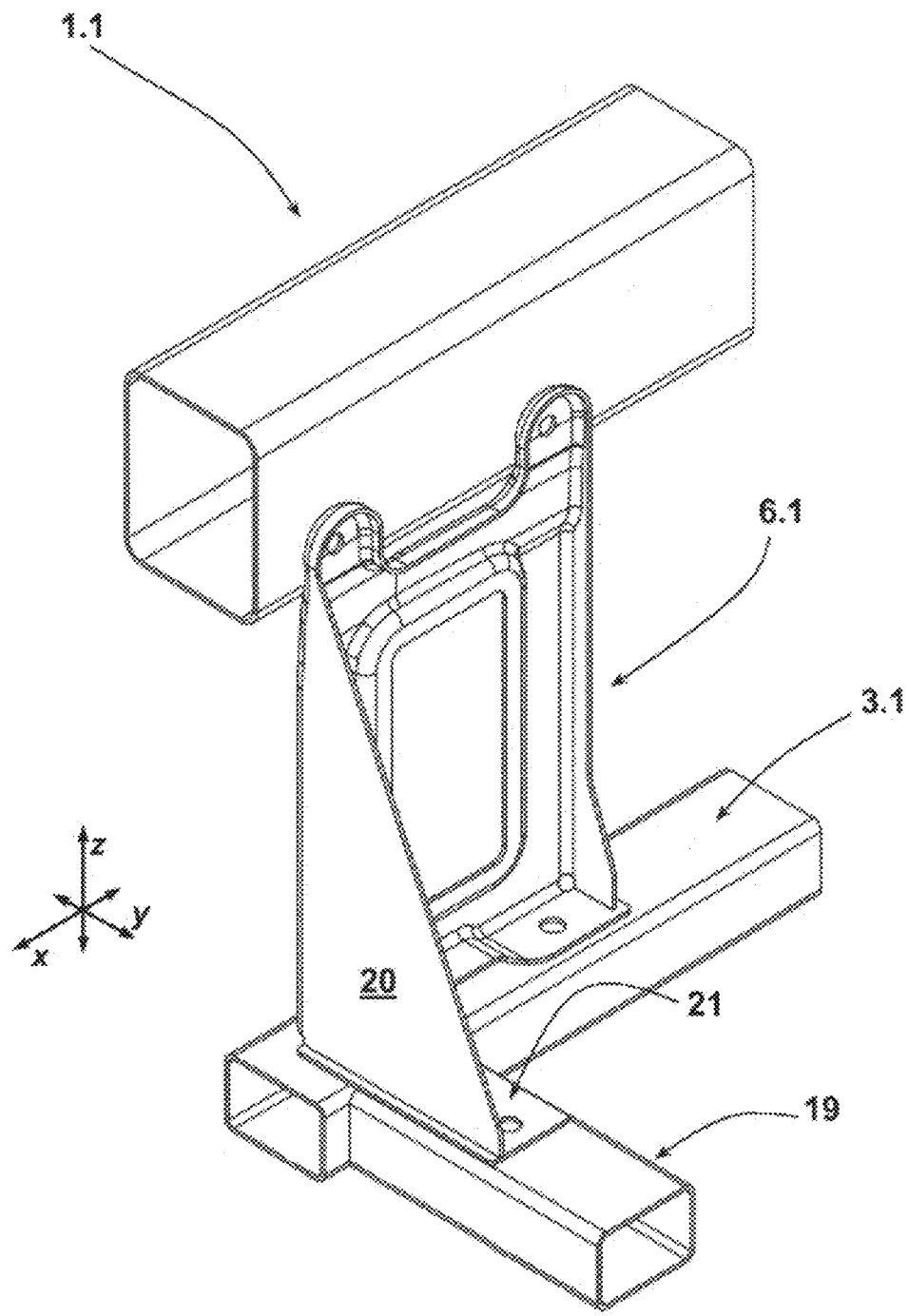
FIG. 4 shows a perspective schematic view of a further vehicle longitudinal member arrangement.

FIG. 4 shows another vehicle longitudinal member arrangement 1.1, which is constructed in principle like the arrangement described in FIG. 3. The vehicle longitudinal member arrangement 1.1 of FIG. 4 shows one that is arranged on the left side of the vehicle in the direction of travel of the vehicle. The statements made with regard to the vehicle longitudinal member arrangement 1 therefore apply likewise to the vehicle longitudinal member arrangement 1.1. The vehicle longitudinal member arrangement 1.1 differs from vehicle longitudinal member arrangement 1 in that a transverse extension 19 pointing outward in the y direction is arranged on each of the two lower longitudinal members 3.1. In the event of a crash, this transverse extension 19 is supported against a wheel (not shown) behind it in the direction of travel (x direction). This configuration of the lower longitudinal member 3.1 is used to attach the connection component 6.1 to the lower longitudinal member 3.1 along with its transverse extension 19. Connection component 6.1 is embodied as an angled connection component. Its main part corresponds to connection component 6. In connection component 6.1, the edge that faces the bumper cross-member 5 and extends in the y-z plane is configured as lengthened and extends as a wall 20 above the transverse extension 19. As is clear from FIG. 4, the wall 20 runs in the y-z plane. Connection component 6.1 is fastened to the transverse extension 19 via a lower edge 21 formed on the wall 20. This configuration enlarges the attachment area between the connection component 6.1 and the lower longitudinal member arrangement 3.1, 19, but without impairing the deformation behavior in the x direction. The angled configuration of the connection component 6.1 reinforces the connections of the vehicle longitudinal member arrangement 1.1.

As is clear from the description of the vehicle longitudinal member arrangements 1, 1.1, the intended plastic deformation of the longitudinal members 2, 3 connected to the respective connection component 6 or 6.1 is not impaired or is virtually unimpaired by the same. Therefore, the connection component 6 or 6.1 can also have a greater length in the x direction.

In a configuration not shown in the figures, a connection component of this type is embodied as having twice the length in the x direction.

This connection component has an upper attachment section and a lower attachment section with three attachment points spaced apart from one another. Needless to say, such a connection component can also have additional attachment points in the upper and lower attachment sections in order to increase the longitudinal extension of the same.

Similarly, more than two longitudinal members arranged one above the other in the z direction can also be connected to one another.

The vehicle longitudinal member arrangement described can be used at both the front of the vehicle and the rear of the vehicle.

The invention has been described in the context of example embodiments. Without departing from the scope of the applicable claims, numerous other possibilities for implementing the invention will be apparent to a person skilled in the art without these being explained in greater detail in this description.

LIST OF REFERENCE SIGNS

1, 1.1 vehicle longitudinal r ember arrangement
2 upper longitudinal member
3, 3.1 lower longitudinal member
4, 4.1 crash box
5 bumper cross-member
6, 6.1 connection component
7, 7.1 edge
8 upper attachment section
9 lower attachment section
10, 10.1 protruding segment
11, 11.1 protruding segment
12, 12.1 attachment point
13, 13.1 attachment point
14 cutout
15 stamped formation
16 rib
17 lateral wall
18 upper side
19 transverse extension
20 wall

The invention claimed is:

1. A vehicle longitudinal member arrangement comprising:
   two longitudinal members spaced apart from one another in the z direction and designed to absorb energy in the case of an impact, and
   a connection component which connects the longitudinal members to one another, the connection component has its main extension in one plane and has an upper attachment section and a lower attachment section,
   wherein the connection component is arranged with its main extension plane parallel to the longitudinal extension of the longitudinal members connected by said connection component,
   each of the upper and lower attachment sections has two attachment points arranged spaced apart from one another in the longitudinal extension of the longitudinal members, at which attachment points the connection component is connected to the respective longitudinal member, while a section of the connection component located between the attachment points is not connected to the respective longitudinal member, and
   the connection component is designed to be weaker in its section located between the attachment points in the direction of the longitudinal extension of the longitudinal member than sections bearing the attachment points, for the absorption of impact energy.

2. The longitudinal member arrangement of claim 1, wherein each attachment point of the upper attachment section is aligned in the z direction of the connection component with an attachment point of the lower attachment section.

3. The longitudinal member arrangement of claim 2, wherein the attachment sections have protruding segments that extend in the z direction of the connection component and that bear the attachment points.

4. The longitudinal member arrangement of claim 1, wherein the attachment sections have protruding segments that extend in the z direction of the connection component and that bear the attachment points.

5. The longitudinal member arrangement of claim 1, wherein the plane in which the upper attachment section is attached to the upper longitudinal member is different from the plane in which the lower attachment section is attached to the lower longitudinal member.

6. The longitudinal member arrangement of claim 5, wherein the connection component is connected via its upper attachment section to a lateral surface of the upper longitudinal member that faces in the y direction, and the connection component is connected via its lower attachment section to a lateral surface of the lower longitudinal member that faces in the z direction.

7. The longitudinal member arrangement of claim 1, wherein the connection component has at least one crash structure configured to bring about a defined deformation in the case of energy absorption between its attachment points that are spaced apart in the longitudinal extension of the longitudinal members.

8. The longitudinal member arrangement of claim 7, wherein the at least one crash structure is embodied as a stamped formation, as a rib, and/or as a cutout from the connection component.

9. The longitudinal member arrangement of claim 8, wherein the connection component is a formed sheet steel component having an edge that is bent in relation to the main extension plane of the connection component.

10. The longitudinal member arrangement of claim 9, wherein the connection component comprises a central cutout.

11. The longitudinal member arrangement of claim 10, wherein the central cutout is surrounded by a peripheral stamped formation.

12. The longitudinal member arrangement of claim 8, wherein the connection component comprises a central cutout.

13. The longitudinal member arrangement of claim 12, wherein the central cutout is surrounded by a peripheral stamped formation.

14. The longitudinal member arrangement of claim 7, wherein the connection component is a formed sheet steel component having an edge that is bent in relation to the main extension plane of the connection component.

15. The longitudinal member arrangement of claim 14, wherein the connection component comprises a central cutout.

16. The longitudinal member arrangement of claim 15, wherein the central cutout is surrounded by a peripheral stamped formation.

17. The longitudinal member arrangement of claim 1, wherein the connection component comprises a wall extending in the y-z plane.

18. The longitudinal member arrangement of claim 1, wherein the connection component is attached to the longitudinal members via mechanical fasteners.

19. The longitudinal member arrangement of claim 1, wherein three longitudinal members spaced apart from one another in the z direction of the vehicle are connected to one another by the connection component, and, for this purpose, the connection component has attachment points spaced apart from one another in the x direction to enable the connection component to be attached to each longitudinal member at the attachment points that are spaced apart from one another in the x direction.

20. The longitudinal member arrangement of claim 1, wherein the connection component is arranged adjacent to a crash box.

* * * * *